United States Patent [19]

Shirayanagi et al.

[11] Patent Number: 5,366,792
[45] Date of Patent: Nov. 22, 1994

[54] LAMINATED THREE LAYER NON-WOVEN FABRIC WITH IMPROVED INTERFACE AND PROCESS FOR PRODUCING THE SAME

[75] Inventors: Ryutaro Shirayanagi; Masaki Shimizu; Masami Shimokawa, all of Waki, Japan

[73] Assignee: Mitsui Petrochemical Industries, Ltd., Tokyo, Japan

[21] Appl. No.: 994,959

[22] Filed: Dec. 22, 1992

[30] Foreign Application Priority Data

Dec. 27, 1991 [JP] Japan .................................. 3-347429

[51] Int. Cl.5 .......................... B32B 3/10; B32B 7/14
[52] U.S. Cl. ..................... 428/196; 428/198; 428/200; 428/349; 428/355; 428/227
[58] Field of Search ............ 428/245, 246, 282, 193, 428/194, 195, 198, 224, 227, 282, 288; 2/97, 272

[56] References Cited

FOREIGN PATENT DOCUMENTS 235271 10/1990 Japan .

*Primary Examiner*—Patrick J. Ryan
*Assistant Examiner*—Richard C. Weisberger
*Attorney, Agent, or Firm*—Sherman and Shalloway

[57] ABSTRACT

A laminated non-woven fabric comprising a laminated material of an intermediate layer of a melt-blown non-woven fabric obtained by melt-blowing an olefin-type resin, an inner and outer layers of a spun-bonded non-woven fabric which chiefly consists of polyester-type fibers and in which the fibers are bonded together locally and at a coarse density, wherein the fibers constituting the inner and outer layers are inserted in the melt-blown non-woven fabric and are intermingled with fibers in the melt-blown non-woven fabric or in the spun-bonded non-woven fabrics of the opposite sides, so that the layers are coupled together as a unitary structure, and a process for producing the same. In the laminated non-woven fabric, the melt-blown non-woven fabric and the spun-bonded non-woven fabrics are fastened and stuck together free of defects to exhibit softness, porosity, water resisting property and like properties possessed by the melt-blown non-woven fabric as well as strength, hand, touch and like properties possessed by the spun-bonded non-woven fabric to their maximum degrees.

14 Claims, 1 Drawing Sheet

LAMINATED THREE LAYER NON-WOVEN FABRIC WITH IMPROVED INTERFACE AND PROCESS FOR PRODUCING THE SAME

BACKGROUND OF THE INVENTION:

(1) Field of the Invention

The present invention relates to a laminated non-woven fabric having excellent softness and strength and to a process for producing the same. More specifically, the invention relates to a laminated non-woven fabric comprising an intermediate layer of a melt-blown non-woven fabric composed of an olefin-type resin, and inner and outer layers of a spun-bonded non-woven fabric consisting of a polyester-type fiber, which are laminated one upon another, the intermediate layer and the inner and outer layers being bonded together owing to the intermingled fibers, and further relates to a process for producing the same.

(2) Description of the Related Art

A melt-blown non-woven fabric is obtained by extruding a molten resin into fine resin streams which are then brought into contact with a heated gas of a high speed thereby to form non-continuous fibers of fine diameters, and then integrating the fibers on a porous support material. The melt-blown non-woven fabric is relatively soft and is, hence, used for such applications as clothing and medical supplies.

In these applications, however, the melt-blown non-woven fabric by itself lacks strength and exhibits its particular slimy feeling. Therefore, means has been employed to reinforce the melt-blown non-woven fabric and to improve its touch by sticking to it another non-woven fabric obtained by the spun-bonding method or by any other method.

Several kinds of laminated non-woven fabrics have already been proposed in which a non-woven fabric such as a melt-blown non-woven fabric is laminated on a spun-bonded non-woven fabric. For instance, Japanese Patent Publication No. 11148/1985 discloses a non-woven fabric material comprising a web of substantially continuous filaments which have an average filament diameter of greater than about 12 microns and which are deposited in a random fashion and are molecularly oriented, and an integrated mat of largely non-continuous thermoplastic polymeric micro fibers having an average fiber diameter of smaller than about 10 microns and a softening point which is lower by about 10° C. to 40° C. than the softening point of the continuous filaments, the web and the mat being arranged to establish a laminar relationship and bonded together to form intermittently and discretely bonded regions upon the application of heat and pressure.

Moreover, Japanese Patent Publication No. 51725/1988 discloses a laminated non-woven fabric used for a filtering cloth of an air cleaner, wherein a sheet-like spun-bonded fiber layer consisting of thermoplastic synthetic long fibers in which fibers are partly bonded together due to the thermal melt-adhesion, is arranged on one side of an intermediate fiber layer consisting of polyester staple fibers having a thickness of 1 to 6 deniers and a fiber amount of 40 to 60 g/m², a fiber layer consisting of a mixture of two kinds of polyester staple fibers having different thicknesses is arranged on the other side of the intermediate fiber layer, these fiber layers are coupled together as a unitary structure by partly intermingling the fibers of these fiber layers relying upon the needle-punching or the like working, and a resin adhesive is adhered onto the fiber layers which are coupled together as a unitary structure.

Japanese Patent Publication No. 2060/1987 discloses a laminated non-woven sheet for micro filters, which comprises a spun-bonded non-woven fabric consisting of drawn fibers and a sheet (melt-blown non-woven fabric sheet) in which undrawn fibers having an average fiber diameter of smaller than 0.8 denier are melt-adhered to one another, and wherein the undrawn fiber sheet is laminated and bonded under the non-solidified condition onto the spun-bonded non-woven fabric.

Furthermore, Japanese Laid-Open Utility Model Publication No. 102615/1981 discloses a laminated non-woven fabric filter comprising an upper layer of a web constituted by staple fibers of 1 to 20 deniers, an intermediate layer of a web constituted by staple fibers of a denier smaller than that of the upper layer, and a lower layer consisting of a long fiber non-woven fabric having an apparent density of from 0.1 to 0.5 g/cm³, which are coupled together by the needle-punching.

The laminated non-woven fabric in which the melt-blown non-woven fabric and the spun-bonded non-woven fabric are laminated one upon the other, has a suitable degree of permeability and water resisting property, and is suited for such applications as clothing. However, the laminated non-woven fabric of this kind has heretofore been obtained by sticking and laminating the melt-blown non-woven fabric and the spun-bonded non-woven fabric together by applying the heat and pressure like the heat-embossing, or by laminating the two non-woven fabric layers by locally intermingling the fibers thereof by the needle-punching or the water-punching, or by sticking and laminating them together by the ultrasonic-wave working. When they are melt-adhered by the heat, therefore, the melt-adhered portions are solidified and stiffened to impair softness, touch and hand. When they are joined together by the needlepunching or water-punching, the non-woven fabric layer becomes locally uneven and is deviated. Moreover, filaments are broken at the punched portions, deteriorating the junction strength between the non-woven fabric layers.

Even when the non-woven fabrics are stuck together by the ultrasonic-wave working, there develop inconveniences nearly similar to those of when they are melt-adhered together by the heat-embossing.

Thus, there have not yet been provided the laminated non-woven fabrics that exhibit in combination softness, porosity and water resisting property possessed by the melt-blown non-woven fabric, and strength, hand, touch and the like properties possessed by the spun-bonded non-woven fabric.

The object of the present invention therefore is to provide a laminated non-woven fabric having excellent softness and strength, in which the melt-blown non-woven fabric and the spun-bonded non-woven fabric are fastened and stuck together free of the above-mentioned defects, and which exhibits softness, porosity, water resisting property and like properties possessed by the melt-blown non-woven fabric and strength, hand, touch and like properties possessed by the spun-bonded non-woven fabric to their maximum degrees, as well as to provide a process for producing the laminated non-woven fabric.

According to the present invention, there is provided a laminated non-woven fabric of a laminated material which comprises an intermediate layer of a melt-blown non-woven fabric obtained by melt-blowing an olefin-type resin, and inner and outer layers of a spun-bonded non-woven fabric which chiefly consists of polyester-type fibers and in which the fibers are bonded together locally and at a coarse density, wherein the fibers constituting the inner and outer layers are inserted in the melt-blown non-woven fabric and are intermingled with fibers in the melt-blown non-woven fabric or in the spun-bonded non-woven fabrics of the opposite sides, so that the layers are coupled together as a unitary structure.

According to the present invention, furthermore, there is provided a process for producing a laminated non-woven fabric having excellent softness and strength, comprising laminating a melt-blown non-woven fabric obtained by melt-blowing an olefin-type resin and spun-bonded non-woven fabrics which consist chiefly of polyester-type fibers and in which the fibers are bonded together locally and at a coarse density in such a manner that the former non-woven fabric serves as an intermediate layer and the latter non-woven fabrics serve as inner and outer layers, and subjecting the thus laminated material to the water-jet working, so that the fibers constituting the inner and outer layers are inserted in the melt-blown non-woven fabric and are intermingled with fibers in the melt-blown non-woven fabric or in the spun-bonded non-woven fabrics of the opposite sides, and that the layers are coupled together as a unitary structure.

In the present invention, the melt-blown non-woven fabric obtained by melt-blowing an olefin-type resin is used as an intermediate layer, i.e., as a core of the laminated non-woven fabric because of the reasons that it has the smallest weight among the fibers and it exhibits excellent softness, porosity, water resisting property and like properties. However, the melt-blown non-woven fabric has such problems that it is easily fluffed and lacks mechanical strength required for the non-woven fabric. In order to improve these problems according to the present invention, a spun-bonded non-woven fabric consisting chiefly of polyester fibers is laminated on both surfaces of the core to impart thereto excellent strength, hand, touch, etc. possessed by the spun-bonded non-woven fabric. According to the present invention, in this case, a distinguished feature resides in that use is made of a spun-bonded non-woven fabric or a pre-bonded non-woven fabric in which polyester-type fibers are bonded together locally and at a coarse density, and the laminated material is subjected to the water-jet working, so that the fibers of the spun-bonded non-woven fabric constituting the inner and outer layers are inserted in the melt-blown non-woven fabric and are intermingled with fibers in the melt-blown non-woven fabric or in the spun-bonded non-woven fabrics of the opposite sides, and that the layers are coupled together as a unitary structure.

The laminated non-woven fabrics comprising a melt-blown non-woven fabric of an olefin-type resin and a spun-bonded non-woven fabric of polyester-type fibers, have heretofore been known. However, these known laminated non-woven fabrics have all been stuck together by the heat-emboss working or the ultrasonic-wave working, causing the melt-adhered portions to be solidified and stiffened, and imparing softness, touch, hand and like properties as mentioned above.

There has further been known a water-jet method which uses a stream of water column of a high pressure and a high speed in order to mechanically intermingle the fibers in the non-woven fabric. It sounds very queer that the water-jet method was never employed for laminating the melt-blown non-woven fabric of the olefin-type resin and the spun-bonded non-woven fabric of the polyester-type fiber together. However, since fibers constituting the spun-bonded non-woven fabric were allowed to have a very small degree of freedom in the case of the above combination, it might have been difficult with the water-jet method to insert the fibers in the melt-blown non-woven fabric or to effectively intermingle the fibers with those of the spun-bonded non-woven fabric.

According to the present invention, on the other hand, it was discovered that when a spun-bonded non-woven fabric which consists chiefly of polyester-type fibers and in which fibers are bonded together locally and at a coarse density, is selected as a spun-bonded non-woven fabric of the polyester-type fibers and is combined with a melt-blown non-woven fabric of the olefin-type resin, the fibers of the spun-bonded non-woven fabric can be inserted in the melt-blown non-woven fabric when the laminated material is subjected to the water-jet working, and can hence be intermingled with fibers in the melt-blown non-woven fabric or with fibers in the spun-bonded non-woven fabrics of the opposite sides, enabling the non-woven fabrics to be coupled together as a unitary structure.

In the spun-bonded non-woven fabric of polyester-type fibers used in the present invention, it is particularly important that the fibers constituting the fabric are bonded together locally and at a coarse density. When the fibers are completely and strongly bonded together as in a conventional spun-bonded non-woven fabric, there is left no freedom for inserting the fibers in the melt-blown non-woven fabric or for the fibers to be intermingled with fibers in the melt-blown non-woven fabric or with fibers in the spun-bonded non-woven fabrics of the opposite side even when the laminated material is subjected to the water-jet working.

The laminated non-woven fabric of the present invention exhibits a strong interlayer anti-peeling property despite the intermediate layer of the melt-blown non-woven fabric and the inner and outer layers of a spun-bonded non-woven fabric are bonded together by a mechanical intermingling means, and further exhibits a markedly improved strength. Though the spun-bonded non-woven fabric used in the invention has a structure in which the fibers are bonded together locally and at a coarse density, the resulting laminated non-woven fabric exhibits a strong interlayer anti-peeling property and a markedly improved strength presumably due to that free fibers of the spun-bonded non-woven fabric are inserted in the melt-blown non-woven fabric and are intermingled with fibers in the melt-blown non-woven fabric or in the spun-bonded non-woven fabrics of the opposite sides, whereby fibers in the spun-bonded non-woven fabric lose freedom causing the non-woven fabrics to have an increased strength and further causing the non-woven fabrics to be firmly coupled together as a unitary structure. As a matter of course, the water-jet working advantageously brings about a function in that the filaments are little broken unlike that of the needlepunching.

The laminated non-woven fabric of the present invention does not have any melt-adhered portion between the melt-blown non-woven fabric and the spun-bonded non-woven fabrics; i.e., these non-woven fabrics are bonded together by a mechanical intermingling means, and features softness, touch and smoothness which are very superior to those obtained by the heat-embossing.

Figure 1:
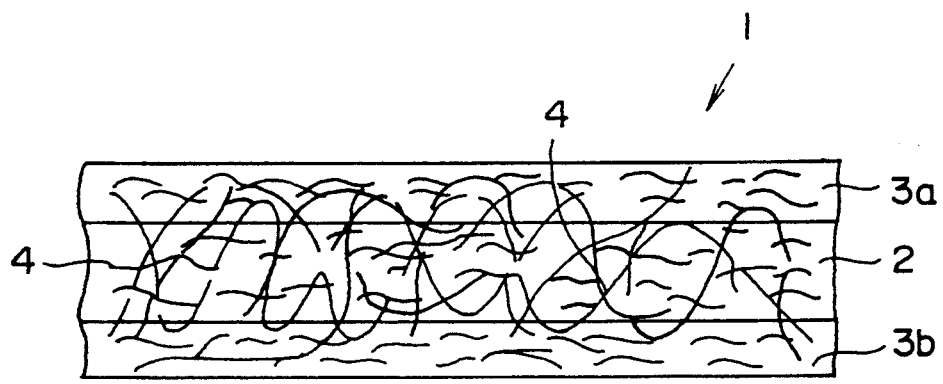
FIG. 1 is a sectional view illustrating the sectional structure of a laminated non-woven fabric of the present invention.

In the drawings, 1 denotes a laminated non-woven fabric, 2 denotes an intermediate layer consisting of a melt-blown non-woven fabric of an olefin-type resin, 3a and 3b are inner and outer layers of a spun-bonded non-woven fabric, 4 denotes free portions of fibers, 10a and 10b denote rollers, 11 is an endless mesh (net) belt, 12 is a laminated material, 13 denotes a roll, 14 denotes a water jet nozzle, 15 denotes high-pressure water, 16 is a column-like water stream, 17 is a vacuum source, 18 is a suction box, 19 is a spun-bonded non-woven fabric of the upper layer, 20 denotes fibers, 21 is a melt-blown non-woven fabric of the intermediate layer, and 22 denotes a spun-bonded non-woven fabric of the lower layer.

DETAILED DESCRIPTION OF THE PREFERRED EMBODIMENT (Laminated non-woven fabric)

In FIG. 1 which illustrates the sectional structure of a laminated non-woven fabric of the present invention, the laminated non-woven fabric 1 comprises a laminated material of an intermediate layer 2 consisting of a melt-blown non-woven fabric obtained by melt-blowing an olefin-type resin and inner and outer layers 3a, 3b of a spun-bonded non-woven fabric which chiefly consists of polyester-type fibers and in which fibers are bonded together locally and at a coarse density. Some part of the fibers constituting the inner and outer layers 3a, 3b, i.e., free portions 4 of the fibers are inserted in the melt-blown non-woven fabric 2 and are intermingled with fibers of the melt-blown non-woven fabric or with fibers in the opposing layers of the spun-bonded non-woven fabric, so that they are coupled together as a unitary structure.

It is desired that the intermediate layer 2 of the melt-blown non-woven fabric exists usually in a weight of 5 to 50 g/m² and, particularly, in a weight of 10 to 30 g/m², and that the inner and outer layers 3a, 3b of the spun-bonded non-woven fabric exist in a weight of 10 to 30 g/m² and, particularly, in a weight of 15 to 25 g/m², respectively.

(Melt-blown non-woven fabric)

The melt-blown non-woven fabric according to the present invention is obtained by extruding a molten olefin resin into fine resin streams which are then brought into contact with a heated gas of a high speed thereby to form non-continuous fibers of fine diameters, and then integrating the fibers on a porous support material.

In producing the non-woven fabric, the starting resin is melted and kneaded in a mono-axial or a multiaxial extruder, and is extruded as fine resin streams through a die for melt-blowing. It is desired that the melting and kneading are usually carried out at a temperature of from 200° to 320° C. and, particularly, from 240° to 300° C. When the temperature is lower than the above range, the melt viscosity becomes too great that the resin cannot be extruded into fine resin streams. When the temperature is higher than the above range, on the other hand, the molecular weight of the olefin resin decreases due to the thermal degradation and the non-woven fabric loses mechanical properties.

The heated gas of a high speed can be introduced into the die for melt-blowing, and the resin streams are brought into contact with the heated gas of a high speed thereby to form non-continuous fibers of fine diameters. From the standpoint of cost, the heated air is usually used as the heated gas of a high speed. In order to prevent the resin from being degraded, however, there may be used an inert gas that is heated. The gas is usually heated at a temperature of from 210° to 330° C. and, particularly, from 250° to 310° C., which should desirably be higher by at least about 10° C. than a temperature at which the resin is melted and kneaded. Further, the flow speed of the heated gas should generally be from about 100 to about 600 m/sec and, particularly, from about 200 to about 400 m/sec. The resin stream is brought into contact with the heated gas of a high speed inside or outside the die for melt-blowing, whereby the resin stream is split and is drafted under the molten condition. The split resin streams are then drawn in the lengthwise direction of fibers, so that the fibers become more fine. Web-like blown from the melt-blowing die in the form of noncontinuous fibers of fine diameters are then integrated on a porous support material thereby to obtain a non-woven fabric.

In the present invention, the diameter and length of the individual fibers in the melt-blown non-woven fabric vary depending upon the applications and cannot be definitely determined. In general, however, the fiber diameter should lie within a range of from 0.1 to 10 $\mu$m and, particularly, from 1 to 6 $\mu$m, and the fiber length should lie in average within a range of from 50 to 200 mm and, particularly, from 80 to 150 mm.

Any melt-blown non-woven fabric can be used provided it is composed of an olefin resin having fiber-forming property. Generally speaking, however, an olefin resin comprising chiefly a polypropylene is favorably used from the standpoint of heat resistance. The polypropylene exhibits excellent properties required for the fibers, exhibits excellent spinnability or spinning property in a step of melt-blowing, and further exhibits excellent sanitary properties.

The polypropylene should be a crystalline propylene homopolymer. The polypropylene should have a melt flow rate (MFR) of from 20 to 1000 g/10 min. and, particularly, from 30 to 800 g/10 min. It should be comprehended that there can be used a crystalline random or block copolymer of the propylene and a small amount of an $\alpha$-olefin within a range that satisfies the abovementioned conditions.

The polypropylene used in the present invention may be blended with a reforming resin in such an amount that it does not impair the properties of the polypropylene. Examples of such a resin include such homopolymers as an ethylene, a 1-butene, a 1-pentene, a 1-hexene, a 4-methyl-1-pentene, a 1-octene, and a 1-decene, as well as a copolymer thereof. The polypropylene blended with a resin having a small compatibility relative thereto offers such as advantage that micro fibers can be formed through the melt-blowing. It is desired that such resins are blended in amounts of smaller than 30% by weight and, particularly, smaller than 20% by weight with respect to the polypropylene.

(Spun-bonded non-woven fabric)

In the present invention, the spun-bonded non-woven fabric is the one which consists chiefly of polyester-type fibers in which the fibers are bonded together locally and at a coarse density. Any non-woven fabric may be used provided it satisfies the above-mentioned conditions. Generally, however, there is preferably used a spun-bonded non-woven fabric which is a mixed yarn non-woven fabric of polyethylene terephthalate fibers and copolyester fibers having a melting point lower than that of the polyethylene terephthalate, the spun-bonded non-woven fabric being pre-bonded locally and at a coarse density.

The spun-bonded non-woven fabric consists of polyethylene terephthalate fibers and copolyester fibers having a melting point lower than that of the polyethylene terephthalate at a weight ratio of from 95:5 to 70;30 and, particularly, at a weight ratio of 90:10, and in which the copolyester fibers only undergo melting so that the mixed yarn non-woven fabric is prebonded locally and at a coarse density.

A representative example of the spun-bonded non-woven fabric may be the one which is obtained by integrating the polyester filaments which are spun and drawn on a porous support material in a random fashion followed by pre-bonding. The spun-bonded non-woven fabric of this type consists of continuous filaments which are molecularly oriented by the drawing, and is excellent in strength. The spun-bonded non-woven fabric should preferably be pre-bonded relying upon the copolyester which has a low melting point, but may be those which are pre-bonded locally and at a coarse density and in which fibers are intermingled together by such means as needle-punching, air suction, water jet, or the like method.

The spun-bonded non-woven fabric used in the present invention may be comprised of long fibers such as filaments of polyester-type fibers, staple fibers thereof, or a mixture thereof, as a matter of course. The filaments or the staple fibers should have a size which usually lies within a range of from 1 to 3 deniers.

(Production process)

According to the present invention, the laminated non-woven fabric is produced by laminating a melt-blown non-woven fabric obtained by melt-blowing an olefin-type resin and spun-bonded fabrics which consist chiefly of polyester-type fibers and in which the fibers are bonded together locally and at a coarse density in such a manner that the former non-woven fabric serves as an intermediate layer and the latter non-woven fabrics serve as inner and outer layers, and subjecting the thus laminated material to the water-jet working, so that the fibers constituting the inner and outer layers are inserted in the melt-blown non-woven fabric and are intermingled with fibers in the melt-blown non-woven fabric or in the spun-bonded fabrics of the opposite sides, and that the layers are coupled together as a unitary structure.

Figure 2:
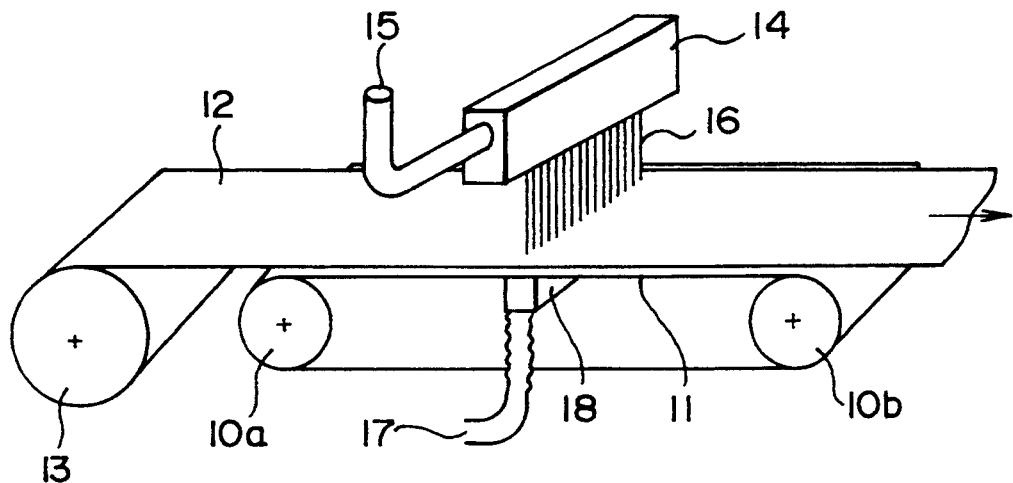
FIG. 2 is a perspective view illustrating a process for producing the laminated non-woven fabric of the present invention.

Referring to FIG. 2 which illustrates a process for producing the laminated non-woven fabric, an endless mesh (net) belt 11 is driven being supported by a pair of rollers 10a and 10b. A laminated material 12 consisting of a spun-bonded non-woven fabric of polyester-type fibers, a melt-blown non-woven fabric of an olefin-type resin, and a spun-bonded non-woven fabric of polyester-type fibers, is unwound from a roll 13 and is supplied onto the mesh belt 11. Water jet nozzles 14 are arranged on the mesh belt 11 maintaining a distance, and high-pressure water 15 is supplied to the nozzles 14, so that column-like water streams 16 of high pressure and high speed are injected toward the laminated material 12 on the mesh belt. Under the mesh belt 11 is arranged a suction box 18 connected to a vacuum source 17.

Figure 3:
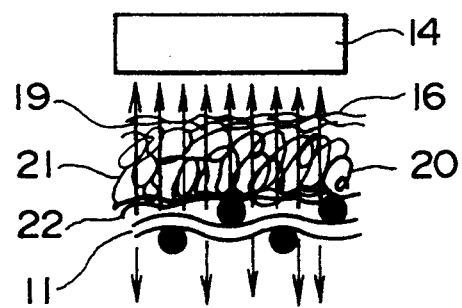
FIG. 3 is a diagram illustrating the formation of intermingling by the water-jet working.

In FIG. 3 which explains the formation of interminglings by the water-jet working, the column-like water streams 16 of high pressure and high speed from the water jet nozzles 14 collide, first, onto the spun-bonded non-woven fabric 16 of the upper layer causing the fibers 20 thereof to be inserted in the melt-blown non-woven fabric 21 of the intermediate layer. The column-like water streams 16 then come into collision with the mesh belt 11 and are reflected in random directions. The fibers 20 are carried in random directions by the column-like water streams 16 that are reflected, and are intermingled with fibers of the melt-blown non-woven fabric 21 or with fibers of the spun-bonded non-woven fabric 22 of the lower layer.

(EXAMPLE)

The invention will now be concretely described by way of the following example.

The testing methods carried out in the example were as follows:

(Tension test)

The testing machine was an Instron tester, and test pieces measuring 50×200 mm were tested between the chucks maintaining a distance of 100 mm at a speed of 200 mm/min.

(Softness test)

The measurement was taken by using a friction tester, model KES-SE, manufactured by Karo Tec Co. This instrument quantitatively measures the touch of a substance felt by human skin in terms of two kinds of values, i.e., slipping property (MIU) and smoothness (MMD), and is well used for evaluating paper diapers and tissue papers.

The smaller the values MIU and MMD, the more slippery and smooth the fabric is. As will be understood from the measurement of paper diapers and tissue papers conducted by the manufactures, significant differences are recognized when the value is greater than 0.02 in the case of MIU and is greater than 0.002 in the case of MMD.

When MIU is smaller than 0.26 and MMD is smaller than 0.012, it can be said that the fabric is slippery and is smooth.

In the working example, symbol PET denotes a polyethylene terephthalate, SPB denotes a spun-bonded non-woven fabric, PP denotes a polypropylene, and MB denotes a melt-blown non-woven fabric.

(EXAMPLE I) PET-SPB/PP-MB/PET-SPB laminated non-woven fabric.

First, fabrics of each of the layers were prepared. The intermediate layer was obtained by throwing a polypropylene S-900 (Mitsui Petrochemical Co.) into a monoaxial extruder of a diameter of 65 mm, melting it at 280° C. (at a cylinder head), and melt-blowing it through a die connected to the end thereof.

The dies were arranged in two rows maintaining a width of 3 m, and the air heated at 320° C. was introduced thereto at a flow rate of 700 m³/Hr.

The resin was blown at a rate of 39 kg/Hr, and the weight of the web was adjusted to be 20 g/m². The takeup speed was about 25 m/min.

As for the spun-bonded non-woven fabric of the surface layer, a mixed yarn product of a homo-PET (m.p., 265° C.) and a co-PET (m.p., 187° C.) was held by the roll in a manner that the co-PET fibers only having a low melting point were melted at a temperature between their melting points, in order to obtain a pre-bonded article that was locally bonded and that would contribute to improving water-jet workability. The weight was 20 g/m². The ratio of co-PET was 8% by weight the roll temperature was 215° C., the line pressure was 30 kg/cm, and the working speed was 20 m/min.

The thus prepared layers were stuck together by the water-jet working, in order to prepare a non-woven fabric.

The water-jet working was carried out under the conditions of 50 kg/cm² through two stages and 80 kg/cm² through two stages after the pre-wetting for the surface A, and the same conditions for the surface B, at a speed of 10 m/min.

Table 1 shows the measured results of strength and Table 2 shows the measured results of softness.

TABLE 1

|  | Vertical | Lateral |
|---|---|---|
| Tensile strength kg/50 mm in width | 6.5 | 5.5 |
| Measuring conditions |  |  |
| Temperature: | 23° C. |  |
| Humidity: | 50% RH |  |
| Testing machine: | Instron tester |  |
| Test piece: | 50 × 300 mm |  |
| Distance between the chucks: | 200 mm |  |
| Pulling speed: | 200 mm/min. |  |

(Comparative Examples 1 and 2)

Instead of using the pre-bonded article as the spun-bonded fabric of the surface layer in Example 1, there were used the homo-PET-SPB that was completely heat-bonded and the polypropylene spun-bonded article, and it was attempted to stick them by the water-jet working. However, the fibers of the spun-bonded fabric were not sufficiently coupled even after the application of water stream of high pressure. The fabric easily peeled off the melt-blown layer and could not be coupled thereto.

(Comparative Example 3)

In Example 1, the laminated material of Example 1 was subjected not to the water-jet working but to the heat-embossing under the following conditions.

| Temperature | 210° C. |
|---|---|
| Line pressure | 25 kg/cm |
| Distance between the bonds | 2 mm |

The obtained non-woven fabric was tested for its softness. The results were as shown in Table 2.

Table 2

| Item | Water-jet SMS | Heat-emboss SMS |
|---|---|---|
| MIU | 0.24 | 0.28 |
| MMD | 0.009 | 0.012 |
| Measuring conditions |  |  |
| Temperature: |  | 23° C. |
| Humidity: |  | 50% RH |
| Testing machine: |  | Friction tester, Model KES-S (Kato Tec Co.) |
| Load: |  | 50 g |
| Friction speed: |  | 1 mm/sec. |
| Distance of measurement: |  | 30 mm |

It will be understood from the above results that the SMS obtained by subjecting the pre-bonded spun-bonded non-woven fabric to the water-jet working is superior in touch to the SMS obtained through the heat-embossing. Moreover, a sufficiently large strength was obtained as shown in Table 1.

When the non-woven fabrics are to be used as materials for disposable working clothes, the tensile strength of greater than 3 kg/50 mm in width is usually required. The non-woven fabric prepared according to the present invention exhibits excellent strength though the three layers are not melt-bonded together as a unitary structure.

We claim:

1. A laminated non-woven fabric comprising a laminated material of an intermediate layer of a melt-blown non-woven fabric obtained by melt-blowing a polyolefin resin, and inner and outer layers of a spun-bonded non-woven fabric which chiefly consists of polyester fibers, wherein said spun-bonded non-woven fabric has locally bonded portions of fibers, where the fibers are weakly-bonded together in such a manner that they are not completely melted together and said laminated non-woven fabric is obtained by water-jet treating the laminated material comprising the intermediate layer and the inner and outer layers so that the fibers of the inner and outer layers are inserted in the melt-blown non-woven fabric and are intermingled with fibers in the melt-blown non-woven fabric to form coupled layers as a unitary structure.

2. A laminated non-woven fabric according to claim 1, wherein the melt-blown non-woven fabric is formed by melt-blowing a polyolefin resin containing at least 70% by weight of polypropylene, and the spun-bonded non-woven fabric consists of a mixed yarn non-woven fabric of polyethylene terephthalate fibers and polyester fibers having a melting point lower than that of said polyethylene terephthalate fibers, and said spun-bonded non-woven fabric are locally and weakly pre-bonded together in such a manner that only the polyester fibers are melt adhered to the fibers of polyethylene terephthalate.

3. A laminated non-woven fabric according to claim 2, wherein the spun-bonded non-woven fabric contains the polyethylene terephthalate fibers and the polyester fibers having a melting point lower than that of said polyethylene terephthalate at a weight ratio of from 95:5 to 70:30, and wherein the polyester fibers only are melted so that the mixed yarn non-woven fabric is locally and weakly pre-bonded.

4. A laminated non-woven fabric according to claim 1, wherein the intermediate layer of the melt-blown non-woven fabric exists in a weight of from 5 to 50 g/m², and the inner and outer layers of the spun-bonded non-woven fabric exist in a weight of from 10 to 30 g/m², respectively.

5. A process for producing a laminated non-woven fabric having excellent softness and strength, comprising the steps of laminating a melt-blown non-woven fabric obtained by melt-blowing a polyolefin resin as an intermediate layer and spun-bonded non-woven fabrics which consist chiefly of polyester fibers and in which the fibers are heat-bonded together locally and weakly in such a manner that they are not completely melted together, as inner and outer layers, and subjecting the laminated material to the water-jet working, so that the fibers constituting the inner and outer layers are inserted in the melt-blown non-woven fabric and are intermingled with fibers in the melt-blown no-woven fabric, and that the layers are coupled together as a unitary structure.

6. A material for clothing comprising the laminated non-woven fabric of claim 1.

7. A laminated non-woven fabric according to claim 1, wherein the fibers constituting the inner and outer layers are inserted in the melt-blown non-woven fabric and are intermingled with fibers in the melt-blown non-woven fabric and in the spun-bonded non-woven fabrics of the opposite sides to form coupled layers as a unitary structure.

8. A process according to claim 5, wherein the fibers constituting the inner and outer layers are inserted in the melt-blown non-woven fabrics and are intermingled with the fibers in the melt-blown non-woven fabric and in the spun-bonded fabrics of the opposite sides.

9. A laminated non-woven fabric comprising a laminated material of an intermediate layer of a melt-blown non-woven fabric obtained by melt-blowing polyolefin resin, and inner and outer layers of a spun-bonded non-woven fabric which comprises two polyethylene terephthalate fibers of different melting temperatures and in which the fibers are bonded together locally and said laminated non-woven fabric is obtained by water-jet treating the laminated material, wherein the fibers constituting the inner and outer layers are inserted in the melt-blown non-woven fabric and are intermingled with fibers in the melt-blown non-woven fabric, so that the fibers of the inner and outer layers are inserted in the intermediate layer, and that the fibers of these layers are intermingled together as a unitary structure.

10. A laminated non-woven fabric according to claim 9, wherein the melt-blown non-woven fabric is formed by melt-blowing a polypropylene resin and the spun-bonded non-woven fabric consists essentially of a mixed yarn non-woven fabric of first polyethylene terephthalate fibers and second polyethylene terephthalate fibers which are locally and weakly pre-bonded together, said second polyethylene terephthalate fibers having a melting point lower than that of said first polyethylene terephthalate fibers.

11. A laminated non-woven fabric according to claim 9, wherein the spun-bonded non-woven fabric contains polyethylene terephthalate homopolymer fibers and polyethylene terephthalate copolymer fibers having a melting point lower than that of said polyethylene terephthalate homopolymer fibers at a weight ratio of from 95:5 to 70:30, and wherein the polyethylene terephthalate copolymer fibers only are melted so that the mixed yarn non-woven fabric is locally and weakly pre-bonded.

12. A laminated non-woven fabric according to claim 9, wherein the intermediate layer of the melt-blown non-woven fabric exist in a weight of from 5 to 50 g/m², and the inner and outer layers of the spun-bonded non-woven fabric exist in a weight of from 10 to 30 g/m², respectively.

13. A laminated non-woven fabric according to claim 9, wherein the fibers constituting the inner and outer layers are inserted in the melt-blown non-woven fabric and are intermingled with fibers in the melt-blown non-woven fabric and in the spun-bonded non-woven fabrics of the opposite sides to form coupled layers as a unitary structure.

14. A laminated non-woven fabric according to claim 9, wherein the melt-blown polyolefin resin fibers constituting the intermediate layer are 0.1 to 10 μm in diameter and are 50 to 200 μm in length.

* * * * *